(12) United States Patent
Bremauer (10) Patent No.: US 7,658,824 B2
(45) Date of Patent: Feb. 9, 2010

(54) ELECTROLYTIC SANITISER GENERATOR

(76) Inventor: Ben Bremauer, 1B, 39-45 Susan Street, Eltham, Victoria (AU) 3095

( * ) Notice: Subject to any disclaimer, the term of this patent is extended or adjusted under 35 U.S.C. 154(b) by 800 days.

(21) Appl. No.: 10/559,520

(22) PCT Filed: Jun. 7, 2004

(86) PCT No.: PCT/AU2004/000750

§ 371 (c)(1),
(2), (4) Date: Dec. 6, 2005

(87) PCT Pub. No.: WO2004/108613

PCT Pub. Date: Dec. 16, 2004

(65) Prior Publication Data

US 2006/0249400 A1    Nov. 9, 2006

(30) Foreign Application Priority Data

Jun. 6, 2003   (AU) .............................. 2003902831

(51) Int. Cl.
C25B 9/00    (2006.01)
C02F 1/467   (2006.01)
(52) U.S. Cl. .................. 204/275.1; 204/228.1; 210/748
(58) Field of Classification Search ....................... None
See application file for complete search history.

(56) References Cited

U.S. PATENT DOCUMENTS 4,036,726 A * 7/1977 Gale et al. ............... 204/229.6
6,080,313 A * 6/2000 Kelada ....................... 210/631
6,267,855 B1   7/2001 Watanabe et al.
6,468,412 B2  10/2002 Bryan

FOREIGN PATENT DOCUMENTS

| EP | 0 650 930 B1 | 12/1998 |
| JP | 2000024670 | 1/2000 |
| JP | 2002069683 | 3/2002 |
| WO | WO 03/040038 A2 | 5/2003 |
| WO | WO 2004/108613 A1 | 12/2004 |

OTHER PUBLICATIONS

PCT International Preliminary Report on Patentability, PCT/AU2004/000750, dated Nov. 1, 2006.
PCT International Search Report, PCT/AU2004\000750, dated Jul. 29, 2004.

* cited by examiner

Primary Examiner—Harry D Wilkins, III
(74) Attorney, Agent, or Firm—TraskBritt (57) ABSTRACT

An electrically powered apparatus for generating a solute such as chlorine to sanitise a body of water such as a pool or spa, a by-product of such generation being an explosive gas such as hydrogen, said apparatus including: a) an electrolytic cell (1) adapted to operate in a substantially vertical orientation through a range of 45 degrees either side of the vertical; b) a water inlet (13) and outlet (14) both located at the lower end of said electrolytic cell (1); and c) a defined space (16) surrounding one or more electrodes (28) of said electrolytic cell (1), wherein, in the event that water flow through said apparatus ceases and said electrolytic cell (1) continues to produce said explosive gas, said explosive gas will displace water in said defined space (16) until there is no water around said electrodes (28).

16 Claims, 5 Drawing Sheets

SECTION A-A

FIG. 3

SECTION B-B

FIG. 4

SECTION A-A

FIG. 5

ELECTROLYTIC SANITISER GENERATOR

FIELD OF INVENTION

This invention relates to an electrolytic sanitiser generator.

BACKGROUND ART

The following references to and descriptions of prior proposals or products are not intended to be, and are not to be construed as, statements or admissions of common general knowledge in the art in Australia or elsewhere.

Methods of electrolytic chlorination for the purpose of sanitising water, in particular, swimming pool and spa water have been disclosed. However, this invention is also applicable to other water sanitizing processes, such as involving water towers for air conditioning, and particularly any other application that requires the addition of a halogen sanitizer, such as chlorine, chlorine dioxide or bromine. An eleotrolytic chlorine generator may involve the supply of low voltage DC power to an electrolytic cell. Chlorine (or chlorine dioxide) is generated in solution with the relevant salts dissolved in water. The water containing the solute may be passed through the cell for the purpose of sanitizing a body of water, such as a pool, spa or water tower.

It has been disclosed that by adding a specific amount of sodium chloride to the body of water and providing an electrolytic cell powered by a low voltage DC source in a filtration system, chlorine gas may be produced in the cell and dissolved into the feed water. This process can be used to effectively sanitize and treat the body of water. Although an adverse byproduct of this process is the production of hydrogen gas $H_2(g)$, under normal operating conditions the $H_2(g)$ flows with the feed water into the body of water and escapes safely into the atmosphere. However, in some circumstances the water flow conditions may not be normal and it is at these times that safety issues arise with respect to $H_2(g)$ containment. For example, a blocked suction line, closed valve(s), incorrect installation or a seized pump can effect a loss of water flow. It may also cause present safety devices to become ineffective, inoperable and/or redundant. In such circumstances, the cell may continue to produce $H_2(g)$ such that the volume of $H_2(g)$ contained in the system may reach dangerously explosive levels. The $H_2(g)$ may continue to be produced and fill not only the cell chamber but all the filtration system plumbing and receptacles. A large $H_2(g)$ reservoir may result leading to a potentially explosive situation.

Electrolytic cells have been disclosed in which the electrodes are positioned in between inlet and discharge ports of the cell with no provision to trap and contain hydrogen gas in the event of a water flow stoppage. These cells are plumbed horizontally or vertically and may use flow switches plumbed in series with the cell to detect a water flow fault condition. In such an arrangement, the flow switch may be designed to suspend power to the cell to minimise the potential a $H_2(g)$ build up.

The use of a flow switch may be considered a good primary safeguard against a loss of water flow. However, the use of a flow switch alone as a single safe guard against hydrogen gas build up has been found, in the inventor's experience, to be insufficient. A flow switch is a mechanical device and therefore has a potential for failure. In the event of a water flow stoppage, a flow switch failure could cause a massive hydrogen gas volume to accumulate in the plumbing and filtration equipment and therefore become hazardous. To the inventor's knowledge and belief, this one safety device, which the inventor believes should only be used as a primary measure, is the only safety feature relied upon by electrolytic chlorinators currently on the market.

Cells have been disclosed having separate flow switches or integral flow switches which operate at 90 degrees to the direction of flow. A cell may be installed without plumbing the cell in a gas loop and where the cell is at the uppermost portion of the loop. In such an installation, an integral flow switch or a separate flow switch may be installed but a failure of the flow switch to detect a water flow failure could lead to a hydrogen gas is build up.

Other manufacturers have used a non mechanical conductive electrode arrangement positioned at the top of a horizontal cell chamber. However, such methods detect only the presence of water and not the flow of water. It may therefore fail to detect a lack of flow of water if the cell is not installed in the horizontal position as generally specified in installation instructions. Moreover, incorrect installation may find the sensor positioned at the lower portion of the cell rendering it effectively redundant. Incorrect orientation of the cell chamber may cause the inherent physical gas loop to no longer contain hydrogen gas in the event of a flow fault. If both return and suction line valves are closed, the chlorinator cell will continue to operate. The inability of the hydrogen gas to displace the water in the cell may lead to a pressure increase in the plumbing system and eventually damage the plumbing and potentially cause injury.

Chlorine generators vary greatly in design both with regard to the operation of the power supply and cell design. Where a single polarity direct current (DC) voltage is applied to the cell electrodes, regular acid washing to dissolve the calcium deposit from the electrodes may be require. Where a DC voltage is applied to the electrode bundle and periodically reversed, the calcium scale deposit may be dissolved to effectively prevent calcium scale build up.

Reversing the polarity onto the electrode bundle to effectively keep the electrodes free of calcium scale has been disclosed. One electrode bundle design previously described involves two electrodes on opposing ends of the plurality of solid plate electrodes having opposing polarity's. When a sufficient DC voltage is applied to the two electrodes and sufficiently saline water is passed through to permit electrolysis, an opposing charge is induced onto the plate surface which is parallel and in closest proximity. The other surface of this same plate attains the opposing polarity and will induce an opposing charge onto the next opposing plate surface and so on.

The electrode bundle effectively conducts the current through the plurality of electrode plates and the reaction to produce chlorine gas on the anode faces of the plates occurs. This electrode bundle design described is a bi-polar design and is used because it is compact. A bi-polar cell may operate as a single polarity system where acid washing is periodically required or when a specialised electrode coating is used. Thus the polarity may be periodically reversed to achieve the self cleaning affect.

The efficiency of electrode bundles is compromised in three major ways:

(1) If the electrode bundle is poorly designed with insufficient physical barriers positioned onto the electrode bundle, the current leakage may be excessive and this compromises efficiency.

(2) If the power supply is poorly designed and the DC voltage applied across the bundle is too low, the efficiency is reduced. Efficient cell designs have been disclosed, but their inability to operate at excessive salt levels without compromise to efficiency and electrode life mean that there is a need for a device which overcomes these difficulties. Manufacturer's salinity requirements vary but over salting of the body of water such as pool or spa water is a common problem. Where the salinity level in, for example, a pool or spa is up to 85% greater than that recommended, the chlorine production efficiency and electrode life time may decline.

Using a power supply with a larger amperage capacity allows the cell to draw a larger current under excess salt conditions. This prevents current limiting devices from prematurely reducing the voltage to the cell (which would otherwise cause the inefficiencies in the cell). However, the excess current drawn by the electrode will compromise the life time of the electrode and deliver more chlorine per hour than officially stated in technical or instruction manuals.

(3) If the salt level is higher than that required to operate the cell at 100% of the manufacturer's stated output, the increased cell load may cause the power supply to limit the current and, in effect, reduce the voltage delivered to the electrode bundle. This may cause the power supply to deliver a voltage of less than 4.0 volts per cell and the cell will produce chlorine inefficiently. It will also fail to clean itself effectively upon polarity reversal and cause excessive current leakage, thus reducing the life time of the electrode bundle.

It is an object of the present invention to ameliorate or overcome one or more of the disadvantages of the prior art or at least provide a useful alternative thereto.

STATEMENT OF INVENTION

Accordingly, in one aspect the invention provides an electrically powered apparatus or generating a solute to sanitize a body of water, the apparatus including an electrolytic cell having a prescribed range of operational orientation outside which it is undesirable for the electrolytic cell to operate; and a tilt switch mechanism associated with the electrolytic cell, wherein the tilt switch is adapted to switch off power to the electrolytic cell when said electrolytic cell is orientated outside the range.

In another aspect, there is provided an apparatus for generation a solute to sanitize a body of water, a by-product of such generation being an explosive gas, the apparatus including an electrolytic cell having a prescribed range of operational orientation outside which it is undesirable for the electrolytic cell to operate; and a water inlet and outlet both located at the lower end of said an electrolytic cell; wherein the range is the upright orientation of the electrolytic cell within 45 degrees to the vertical such that, in use, in the event that water flow through the apparatus ceases, the explosive gas will displace water in the apparatus until there is no water in the electrolytic cell, whereby electrolysis and explosive gas production ceases.

In still another aspect the invention provides an electrically powered apparatus for generating a solute to sanitise a body of water, a by-product of such generation being an explosive gas, said apparatus including:
a) an electrolytic cell operable only in a substantially vertical orientation trough a range of 45 degrees either side of the vertical;
b) a water inlet and outlet both located at the lower end of said electrolytic cell; and
c) a defined space surrounding the electrodes of said electrolytic cell,
wherein, in the event that water flow through said apparatus ceases and said electrolytic cell continues to produce said explosive gas, said explosive gas will displace water in said defined space until there is no water around or between said electrodes, so that electrolysis and explosive gas production cannot continue and the maximum accumulated volume of said explosive gas is substantially restricted to that of said defined space.

In yet another aspect, there is provided a method of installing an apparatus as described above wherein the body of water is serviced by a filter and associated pump, the method including plumbing said apparatus in line and downstream of the pump and filter and orienting said apparatus as close to vertical as possible.

In a particularly preferred arrangement, the apparatus includes an electrolytic cell which is plumbed into a swimming pool or spa filtration system, downstream of an the other receptacles such as a filter or pump.

The apparatus may include one or more of the following:
a lower body chamber comprising a pool or spa water inlet and a chlorinated pool or spa water discharge outlet;
an inner lower body water chamber to direct water flow through an upright electrode bundle column;
a bi-directional water flow by-pass valve contained within the lower body chamber;
an integral non mechanical bi-directional water by-pass port;
a bi-polar electrode bundle contained within the upright electrode column;
an upright cell chamber;
a cell chamber end cap which seals the top of the upright cell chamber and contains the electrical termination points for one or more of the following: the electrode bundle, a flow switch, a vertical cell level switch and one or more salinity/water sensors;
a locking ring to compress the end cap onto the cell chamber using an o-ring to form the water seal;
a stainless steel wire gauze to prevent debris from entering the electrode bundle and is further prevent current leakage;
a lock nut to sealably join the upright cell chamber to the lower body; and/or
a pressure relief valve.

The apparatus includes a power supply, which might be mains AC, but preferably includes a low voltage DC power supply. This may deliver a variable power On/Off duty cycle to the cell based on feed back information a computer processor such as a microprocessor associated with the power supply receives from the electrode bundle. Such information may include salinity levels, water flow rate, water presence and/or current draw.

The low voltage DC power supply may contain a transformer, rectification device and a controlling microprocessor based printed circuit board (PCB) which controls the DC power modulation to the cell.

The apparatus is adapted to restrict the build up of hydrogen gas to less than 2 litres (L) through aspects of the physical design and electronic safeguard of the apparatus.

The cell may contain a vertically operated flow switch, an omni directional cell level switch, conductivity sensors, an integral bi-directional water by-pass and/or a pressure relief valve. All these may combine with the vertical physical design of the cell to minimise the hydrogen gas hazard and maximise safety. Even if the cell is installed incorrectly, back to front, upside down or the fault conditions as previously described in relation to the prior art exist, the inventive device described herein best ensures that the safety aspects of the device are not compromised. A 2 L volume of hydrogen gas is considered safe in the water treatment industry and unlikely to lead to serious damage or injury.

The cell may be an electrolytic halide generating cell which contains an integrated bi-directional water by-pass valve to ensure a regular flow to the cell, a water flow switch, a salinity/water sensor, a pressure relief valve and an omni directional tilt switch for the purposes of delivering a halide sanitizer to a body of water in a safer manner than is presently available.

The apparatus may include a chlorinator power supply that uses current draw information derived from the cell electrodes to modulate and control power delivery to the cell. This current feed back modulation may fully optimise cell efficiency and durability even if the salinity is higher than ideal.

The apparatus may dramatically minimise the horizontal plumbing space required to accommodate an electrolytic cell. The improved safety implications of this will become apparent to the skilled person from this description.

The apparatus may also include a pressure relief valve within a lower body of the cell. The valve may be designed and located such that if the inlet and discharge ports of the cell are closed, all of the electronic protection devices fail and the chlorinator continues to produce hydrogen gas, the pressure relief valve may be adapted to open at 150 kpa to 350 kpa, and preferably 200 kpa to 250 kpa. The relief valve will effectively allow the increased pressure in the cell to force out the water contained and resting in the lower body of the cell. Once the hydrogen gas has displaced the water in the cell, the water will be below the electrode bundle which will be unable to further produce hydrogen gas.

In answer to the disadvantages of the aforementioned prior art in relation to excessively saline water, the present invention may be able to maintain the correct cell voltage even if the salinity level is up to 85% greater than that which is recommended and beyond that normally required to operate the cell at the predetermined chlorine output maximum. Under the present invention, in a preferred form, electrode life may not be compromised as would be the case where an oversized power supply with excessive current capacity is inappropriately applied and the electrode operating time is not reduced.

The apparatus may achieve this in a preferred form by including a microprocessor to process current draw information obtained from the electrode bundle. The current draw information may be directly related to the salt level in the water. If the current draw exceeds a predetermined maximum required for the cell to produce a published chlorine maximum, an On/Off duty cycle of the power delivery to the cell is altered so that the total chlorine production per hour is moderated to correspond to the desired chlorine production rate. Accordingly, the cell may be switched off for a limited time thereby reducing overall chlorine production and extending electrode life.

Where the cell is intended to be installed in a vertical orientation, but is incorrectly installed at an angle of up to 45 degrees from the vertical, based purely on the physical aspects of the cell, the containment of hydrogen gas is limited to the volume of the cell chamber which is preferably less than 2.0 L (but not essentially, as in the case of larger applications). However, it is considered that 2 L is a relatively safe contained gas volume. The inventive arrangement may therefore allow for a large degree of orientation error. However, if the incorrect orientation of the cell exceeds an angle of 45 degrees from the vertical, the physical design alone of the inventive arrangement may not contain the hydrogen gas in the chamber and may allow the hydrogen gas to escape and fill the plumbing and receptacles in the system. This may result in the accumulation of a dangerously large reservoir of hydrogen gas.

Advantageously therefore, a tilt switch mechanism may be provided on or in association with the cell for the purpose of limiting the potential development of a dangerous volume of hydrogen gas in the event that the chlorinator cell is not installed vertically or in the recommended range for the particular application. The switch may suspend power delivery to the cell and prevent the electrolytic reaction that produces the hydrogen gas by-product in the event that the cell is not installed in the correct orientation as per installation instructions.

The tilt switch therefore further obviates hydrogen gas safety concerns associated with incorrect cell installation and/or damaged or sagging plumbing. Where the apparatus includes a controlling microprocessor and associated circuit, if the vertical cell chamber deviates from the vertical by a predetermined value over 45 degrees, the tilt switch will activate causing the circuit to cut power delivery to the cell. This ensures that hydrogen gas is not produced and forces the operator to investigate the cause of the failure and ultimately install the cell in the correct orientation.

The tilt switch could be installed (e.g. retro-installed) in all cell housing designs to improve the safety aspect of existing cell installations. The physical aspects of the upright cell of the invention, however, provide the first safety feature. The tilt switch safety mechanism augments the physical safety feature thus further lessening the likelihood that an excessive and dangerous hydrogen gas build up occurs.

The apparatus may include a water by pass within the lower body of the cell chamber. The by-pass may be bi-directional. In the event that water flow cases and the augmentary flow switch fails, the correctly oriented cell will continue to generate hydrogen gas until it displaces the water in the electrode chamber after which the production of hydrogen gas ceases because it cannot be produced as the electrolytic process cannot occur in the absence of the solution (water). This effectively limits the maximum production of gas to the volume of the chamber which is typically less than 2 L for standard (e.g. domestic) installations. The design of the apparatus is such that even if the valve/s on the return or discharge side of the chlorinator are accidentally closed, the gas will still displace all the water in the cell and contain the gas in the cell chamber by permitting water to return to the feeder side of the system.

A separate bi-directional check valve may be provided which is plumbed as allow control mechanism in the by-pass leg of a salt chlorinator manifold. To be most effective as a hydrogen gas containment aid and flow controller, the valve must provide for the bi-directional flow of water across the valve whilst controlling the water flow provided by the pump through the cell. The flow of water across the opening in this by-pass assembly preferably allows enough water to flow through it in both directions such that it is at least equivalent to the rate at which the hydrogen gas displaces the water in the cell chamber. The valve also may incorporate a tensioned valve which can be altered or set to open and allow the passage of water through it at a predetermined flow rate.

In a preferred form of the invention including a flow switch, if both the suction line valves and the return line valves are accidentally closed such that a net water flow in any direction is not possible, the flow switch activates and ceases power delivery to the electrode bundle. However in its simplest form, the apparatus of the invention may operate without a flow rate control valve or check valve. The apparatus may be adapted to vary the power to, or the activity of, the electrolytic cell whereby to regulate the rate of electrolysis.

The bi-directional water flow by-pass may be included within an internal lower body manifold immediately below the cell. The integral by-pass may serve two purposes:

(1) To deliver a predetermined water flow through the electrode chamber whilst allowing excess water flow to by-pass the electrode chamber; and (2) To prevent undesirable back pressure in systems where the flow rate must high.

The by-pass allows for variable flow through the electrolytic cell and the activity of the cell may be regulated by the microprocessor in response to variations in flow rate and other factors, such as salinity and water body selection (e.g. the spa or pool).

The by-pass valve may be a tension loaded valve. The by-pass valve may be a check valve as discussed later. Whilst not totally preventing a by-pass of water, the tension loaded valve may allow for greater control over the by-pass flow. The by-pass valve preferably does not operate as a positively closing check valve. A standard check valve allows water to pass in only one direction. However, if a standard check valve is utilised and reliance is placed purely on the physical design of the inventive cell, a dangerous hydrogen gas build up could occur under some conditions as described previously, such as where the cell is installed at an orientation greater than 45 degrees to the vertical.

Yet another preferred feature of the inventive chlorinator cell is the substantially vertical or upright arrangement of the electrode bundle itself. The electrode bundle may be any suitable configuration and may comprise multiple plates or other terminal or electrode features. The bundle may be square or circular, oval or rectangular upright in cross-section. The bundle may be squat shaped or elongate. Preferably the bundle comprises between seven and nineteen plates.

Where there is a lower number of plates, the bundle may include an insulator or flow regulator. The flow regular is preferably configured to fill at least a cross-sectional area of the cell chamber not occupied by the electrodes, for example centrally within the cell or, most typically, to one side. The flow regulator may offer resistance to water flow which would otherwise be present with larger numbers of plates to ensure sufficient time exposure to the bundle. The flow regulator may comprise a bracket having one or more lateral portions in a plane normal to the direction of flow and the longitudinal axis of the bundle. It may occupy, in foot print, that portion of the electrode chamber not occupied by the bundle. The lateral portion preferably has one or more apertures to permit a limited flow of water therethrough and consistent with the resistance electrode plates would provide if present in the space occupied by the flow regulator.

The electrolytic cell may include an inner bi-polar electrode bundle. The bundle may be situated centrally or to one side within the cell chamber. The cell chamber may be any suitable configuration. It may be compact or elongate. It may be cylindrical, oval, square or rectangular in cross section. Preferably the cell chamber has an elongate cylindrical shape, square or rectangular section shape.

Water may be directed upwards by the by-pass assembly through the electrode bundle chamber. After exiting the electrode chamber, the water is redirected 180 degrees in a U-turn and flows vertically downwards through an internal, preferably circumferential or annular, space defined by an outer chamber between the electrode bundle chamber wall and an outer cell chamber wall. If the outer cell chamber wall is clear or transparent, the evidence of water flow or electrolysis occurring will be very easy to visually establish by the operator.

The electrode chamber may be connected to an end cap which may be removable for replacement or service of the internal components of the cell. The inventive design allows the cell to be very compact whilst addressing the hydrogen gas containment issues.

Another safety feature is that the direction of flow through the cell electrode chamber could be reversed without jeopardising the safety of the arrangement as a result of incorrect installation.

The inventive cell may include a pressure relief valve in the lower body chamber. In the event that both the inlet port and the exit port are closed, and the electronic protection devices fail to detect the absence of water flow and fail to suspend power to the cell, the pressure relief valve will open to allow the hydrogen gas to displace the water from the cell chamber which, when complete will effectively cause a cessation of electrolysis.

BRIEF DESCRIPTION OF THE DRAWINGS

The invention may therefore be better understood from the following non-limiting description of possible and preferred features of one or more of the preferred embodiments of the invention. It is to be understood that the features illustrated in and described with reference to the drawings are not to be construed as limiting on the scope of the invention. In the drawings.

DETAILED DESCRIPTION OF THE DRAWINGS

In the drawings there is shown an apparatus including an electrolytic cell 1. The apparatus forms part of a swimming pool or spa filtration system (not shown). The apparatus is plumbed downstream of all other working receptacles or components of the system, including the pump and filter. The apparatus includes:

a vertical cell chamber 18;

a lower body 12 depending from the vertical cell chamber 18, the lower body 12 comprising a pool or spa water inlet port 13 and a chlorinated pool or spa water discharge or outlet port 14;

an inner lower body water chamber 15 to direct water flow through opening 4 to a vertical electrode bundle column 16 containing a bi-polar electrode bundle 28;

a bi-directional water flow by-pass valve 17 mounted in the return side wall of the lower body chamber 15;

a non mechanical bi-directional water by-pass valve port 21 integral with the bi-directional water flow by-pass valve 17 or the lower body chamber 15;

a cell chamber end cap 26 to seal the top of the vertical chamber 18 and to contain the electrical terminals 2,3 for the electrode bundle 28, flow switch 20, vertical cell level or tilt switch 22 and salinity/water sensors 23;

a locking ring 24 to compress the end cap 26 onto the cell chamber 18 using an o-ring 25 to form a water- and gas-tight seal;

a stainless steel wire gauze 27 to reduce the amount of debris entering the electrode bundle 28 and to further reduce current leakage;

a lock nut 29 to sealably secure the vertical cell chamber 18 to the lower body 12;

a pressure relief valve 31 spring biased to closed position;

a printed circuit board (PCB) 33 on a panel 32 on which is also mounted the omni-directional tilt switch 22.

The system also includes a low voltage DC power supply (not shown) which delivers a variable power On/Off duty cycle to the cell based on feed back information that the microprocessor associated with the power supply receives from the electrode bundle 28 via the PCB 33. The panel 32 includes 8 downward facing terminals (not shown) which correspondingly make electrical contact with 8 upward extending pins 34 to link the various sensory and operational components of the cell 1 to the PCB 33.

The low voltage DC power supply fed in by electrical lead 35 contains a transformer and rectification device. It is controlled by the microprocessor 33 based printed circuit board (PCB) which controls the DC power modulation to the cell 1. The present invention may be adapted to restrict the build up of hydrogen gas to less than 2 litres (L) in the system through aspects of the physical design and electronic safeguards. An installation method may include installing the cell 1 downstream of all the other filtration receptacles such as the filter and pump (both not shown).

The cell 1 is preferably installed such that the lower body 12 is placed in the plumbing line with the inlet port 13 and the outlet port 14 horizontally positioned. Both ports 13,14 are preferably clearly marked to avoid incorrect directional installation, but if the cell 1 is installed back to front so that the inlet port 13 is connected to an outgoing pipe, none of the safety aspects of the apparatus will be compromised.

Figure 4:
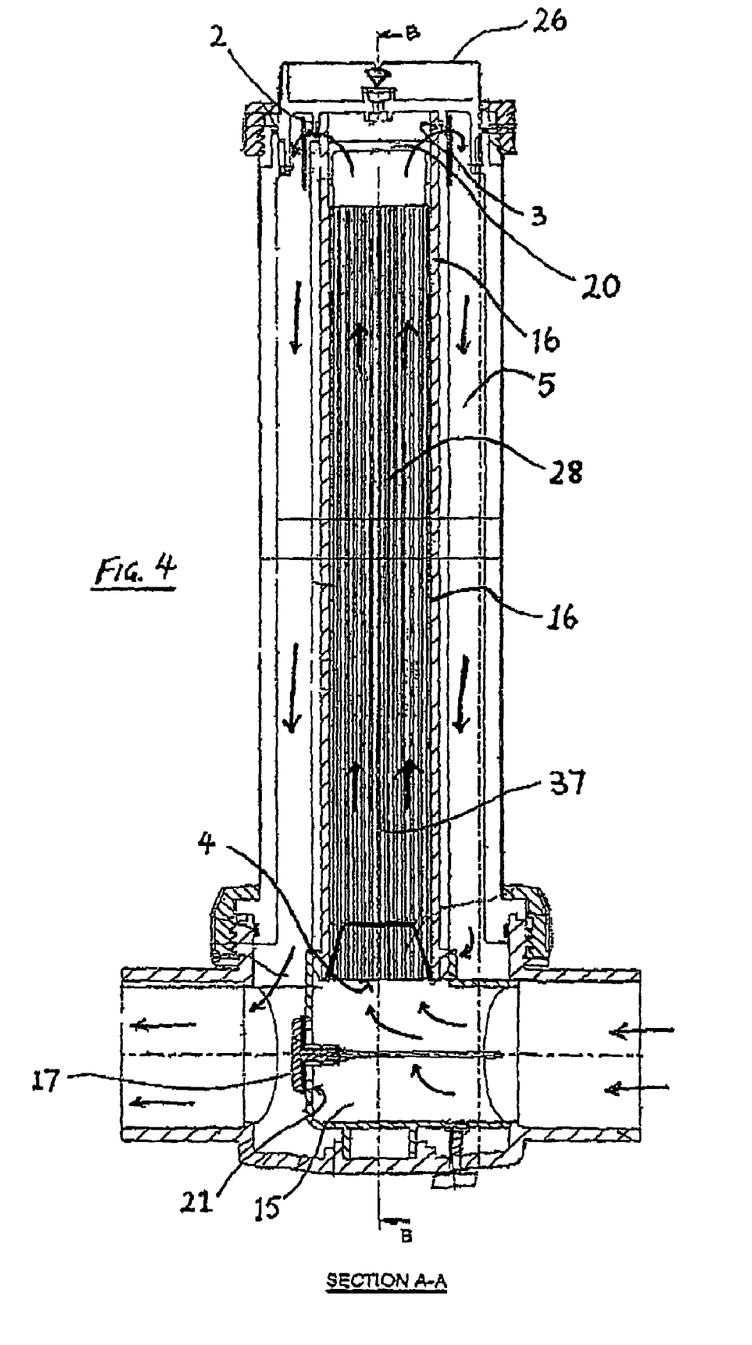
FIG. 4 is the view of FIG. 2 showing the normal direction of flow of water through the system.

Located within the lower body 12 is the inner lower body water chamber 15. As shown in FIG. 4, this chamber 15 directs a proportion of the incoming horizontal water flow upwards in a vertical direction through the electrode bundle column 16 where, in operation, electrolysis occurs.

The lower body chamber 15 also contains the integrated bi-directional water by-pass valve 17. This spring assembly 17 is preferably preset to permit a predetermined proportion or certain flow rate of water to by-pass the cell 1 and the electrode bundle column 16. This effectively reduces the pressure drop across the cell assembly which is desirable in high flow applications.

The by-pass 17 may simply be an opening or series of openings by which water travels from within the internal by-pass chamber 15 and out into the cell discharge line 14 without travelling through the electrode bundle chamber 16. The by-pass 17 contains an opening or series of openings 21 which are only partially blocked by the tension loaded valve 17 which opens at a pre-determined flow rate.

The bi-directional water by-pass valve 17 can not totally restrict the by-pass of water and force all of the water flow through the electrode bundle column 16. The by-pass valve 17 is designed such that it only blocks a percentage of the aperture that is the by-pass valve port 21. The inner lower body chamber 15 therefore allows the water to flow from the inlet port 13 to the outlet port 14 or vice versa. This feature allows hydrogen gas generated by the electrolytic reaction to displace the water in the cell 1 and to contain the hydrogen gas within the cell column 16 in a safe volume in the event that the primary electronic flow switch 20 fails to operate. The flow of water across the opening 4 in this by-pass assembly must allow enough water to flow through the body chamber 15 in both directions such that it is at least equivalent to the maximum rate at which the hydrogen gas displaces the water in the cell chamber 18.

The by-pass assembly of this preferred embodiment relies on the unencumbered passage of water in both directions across the valve 17 to effect the safe and even displacement of water in both the electrode chamber for the bundle column 16 and the outer cell chamber 5 under all conditions of water flow failure. This physical aspect is not compromised in that it is effectively failsafe and is effective as a safety measure in instances where other, perhaps primary, electronic protection devices fail to act. In the event of a flow failure and the failure of the primary electronic protection devices 20, 22 to act the bi-directional by-pass 17 allows the hydrogen gas to evenly displace the water in both the electrode chamber 16 and the outer cell number 5. This eliminates contact of electrolyte with the gas producing electrodes 28 thus ceasing hydrogen gas production. The gas produced will therefore be limited to the volume of the vertical cell chamber 16 which is positioned over and above the horizontally upper-most section of the water inlet 13 and the discharge port 14 located in the lower body manifold 12. The flow of water across the opening in this by-pass assembly preferably allows enough water to flow through it in both directions such that it is at least equivalent to the rate at which the hydrogen gas displaces the water in the cell chamber.

The electrode bundle column 16 is located within the vertical cell chamber 18. The electrolysed water that passes through the column 16 is forced 180 degrees to a vertically downward direction in the annular space of outer chamber 5 between the column 16 and the chamber 18. During electrolysis, the operator will be able to see the gaseous products of the reaction as the electrolysed water flows down through the annular space 5 and out through the discharge port 6 of the chamber 18.

Positioned at the very top of the cell is the cell chamber cap 26 which contains the electrical terminals 2,3 for the electrode bundle 28, the flow switch 20, the omni directional cell level switch 22 and the salinity/water sensors 23.

The integral flow switch 20 is positioned directly above the water exit area 7 of the electrode bundle column 16. The flow switch 20 can be adjusted to switch on and activate the cell 1 at a specified flow rate. The flow switch 20 includes a doughnut-shaped magnet which moves upward along a hollow plastic shaft if sufficient water flows through the water exit area 7 to displace the magnet from a resting position and activate the flow switch 20. The hollow shaft contains a reed switch which recognises the position of the magnet. If the magnet is uppermost (i.e. corresponding to a high flow rate), the switch will close a circuit and the power supply will deliver power to the electrode bundle 28 to effect electrolysis of the water borne electrolyte.

The apparatus includes the vertical cell level or tilt switch 22 which is capable of operating in any orientation such that it may be described as omni-directional. This tilt or tip over switch 22 is wired and fitted into the panel 32 such that if the cell chamber 18 is not vertically upright when plumbed, the tilt switch 22, which will have a predetermined electrical contact break at a specific angle of less than 45 degrees from the vertical, will activate to cut power to the cell 1.

The salinity/water sensors 23 are positioned in the upper portion of the space 5 of the vertical cell chamber 18. The salty/water sensors 23 include two sensor electrodes. The two electrodes test the salinity level periodically. The information is cross referenced with the current passing through, and the voltage of, the electrode bundle 28. This information is processed by the microprocessor in the power supply and the determination of both the salt level and the electrode condition are made and displayed on a display for the benefit of an operator. Process calculations are made according to suitable algorithms to determine the amount of salt to be added and this may also be displayed if information about pool volume is programmed in by, for example, the operator. The salt level sensors 23 also act as another electronic flow-fail safety device. If the sensors 23 detect the absence of water (i.e. electrolyte), the power to the electrode bundle 28 will be cut and a flow fail indication will be displayed.

Figure 1:
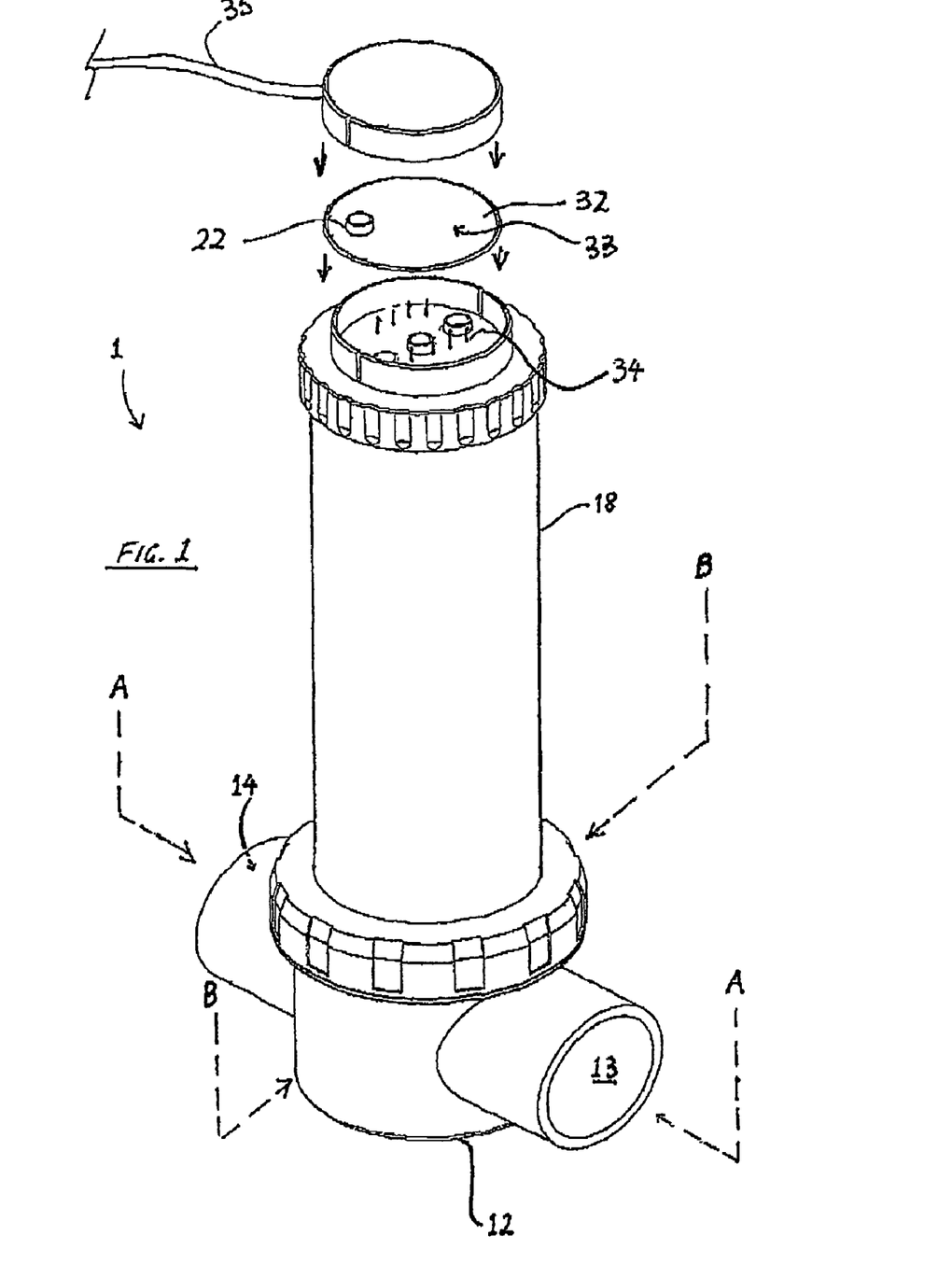
FIG. 1 is a perspective view of an electrolytic cell according to a first embodiment having a full set of electrodes.
Figure 2:
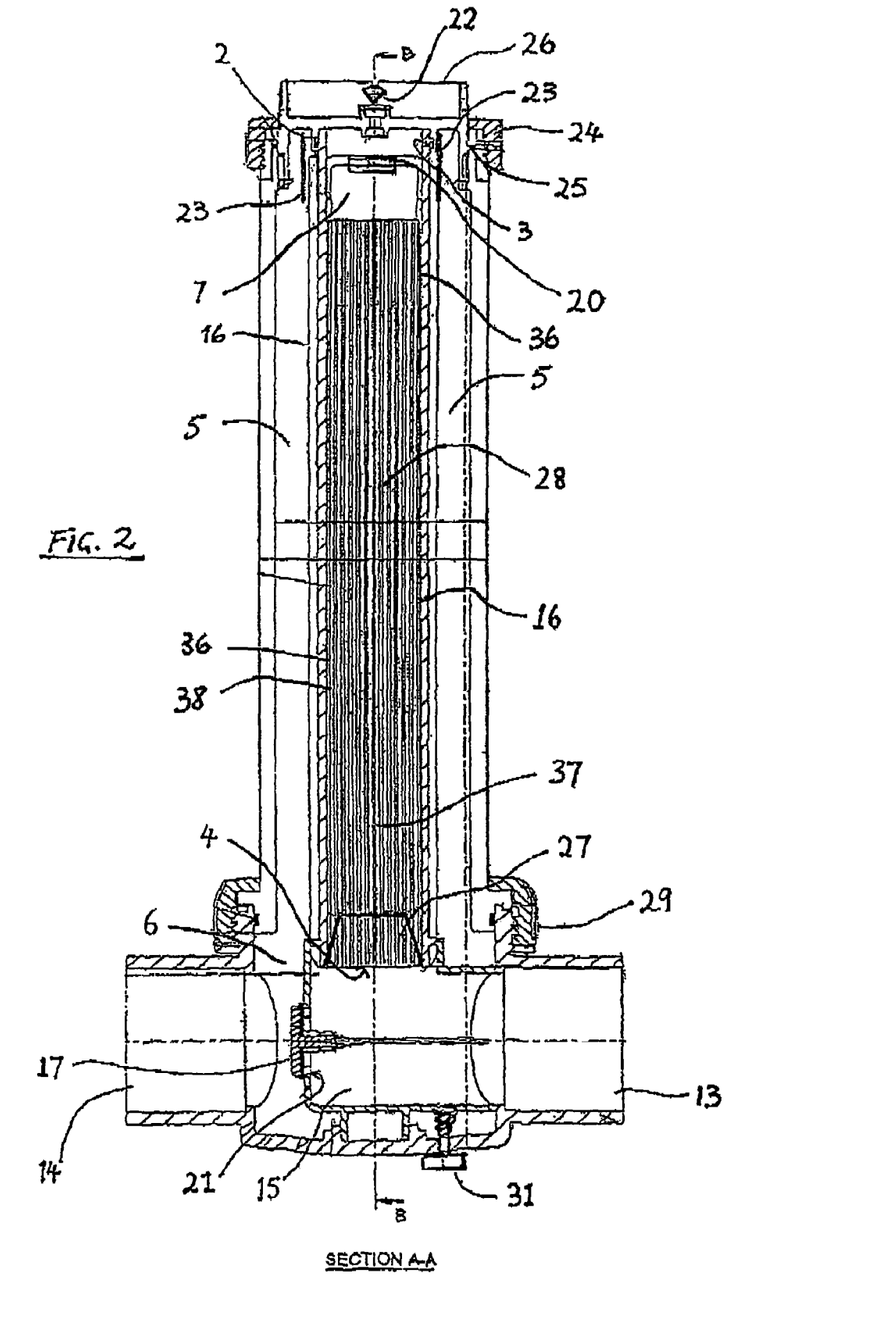
FIG. 2 is a transverse section through section A-A of the first embodiment.
Figure 3:
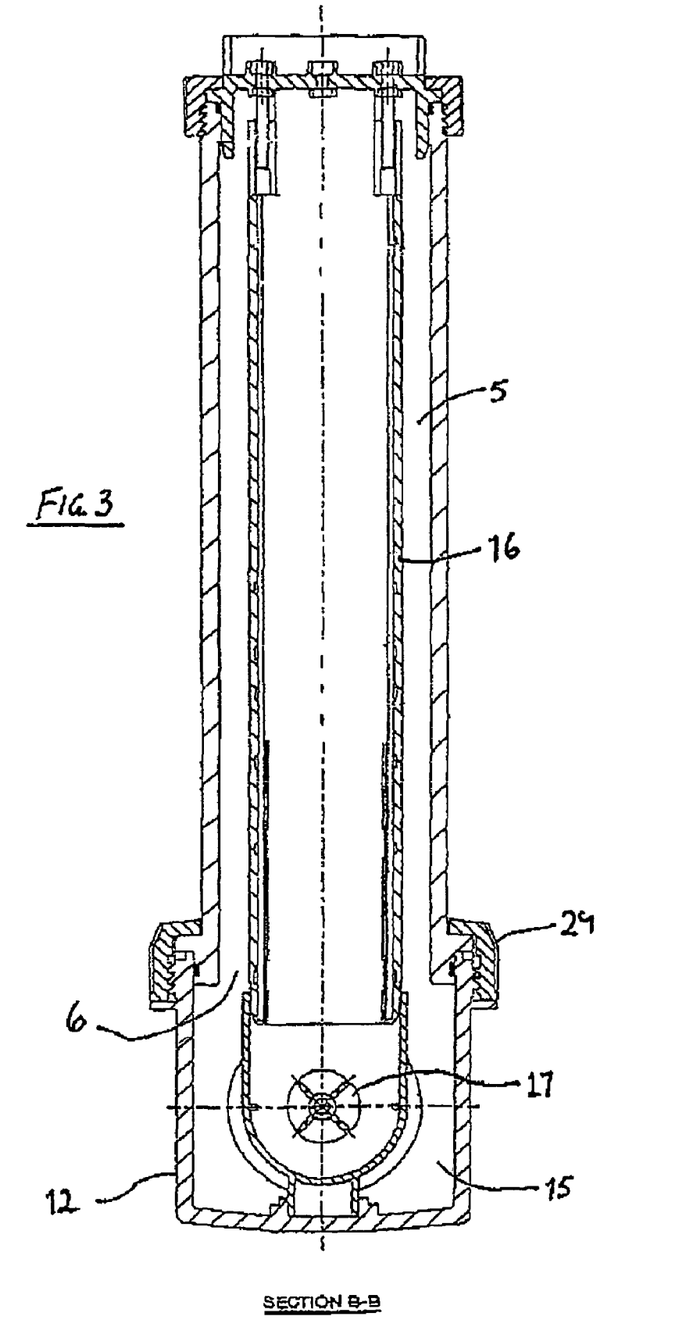
FIG. 3 is a transverse section through section B-B of the first embodiment rotated 90 degrees relative to the view shown in FIG. 2.

The power supply includes a feature which maximises the efficiency and lifetime of a typical bi-polar cell. The cell bundle 28 shown in the first embodiment has thirteen electrode plates all spaced at approximately 2 mm apart and positioned parallel to one another. The two outer plates 36 and the middle plate 37 are connected to the low voltage DC power source. Preferably, 28 VDC is used which in effect delivers 4.7 VDC maximum per cell. However the person skilled in the art will appreciate that there are many variations on this arrangement whereby the number of plates 38 and the amount of DC voltage may be varied depending on the application, cost and space constraints. Indeed, in FIG. 5 there is shown all alternative second embodiment in which the electrode bundle 128 contains only 7 plates 138. The flow rate of the second embodiment cell 101, compared to that of the full complement of plates 38 (as shown in FIG. 2) is substantially the some because of the inclusion in the cell chamber 116 of one or more flow regulators 40. The flow regulator 40 includes one or more lateral members 41 extending across the flow path which restrict flow, but permit some flow of the order of that flow which would be permitted if footprint occupied by the flow regulator 40 were replaced by electrode plates 138. The flow regulator 40 is typically an integrally moulded plastic insert with an elongate member 42 extending the full length of the plates 138 and top, bottom, and intermediate lateral members 41 extending from the middle plate 137 to the outer wall 117 of the cell chamber 116. Apertures 43 (which may vary in size and number depending on the application) in each of the lateral members 41 provide the necessary conduit for flow through the area occupied by the flow regulator 41. Typically, the cells 1,101 are square of rectangular in cross section normal to the longitudinal axis and/or flow direction whereby the plates 38,128 may be of the sane width and the lateral members 41 may be square or rectangular and simple to size and fit.

Figure 5:
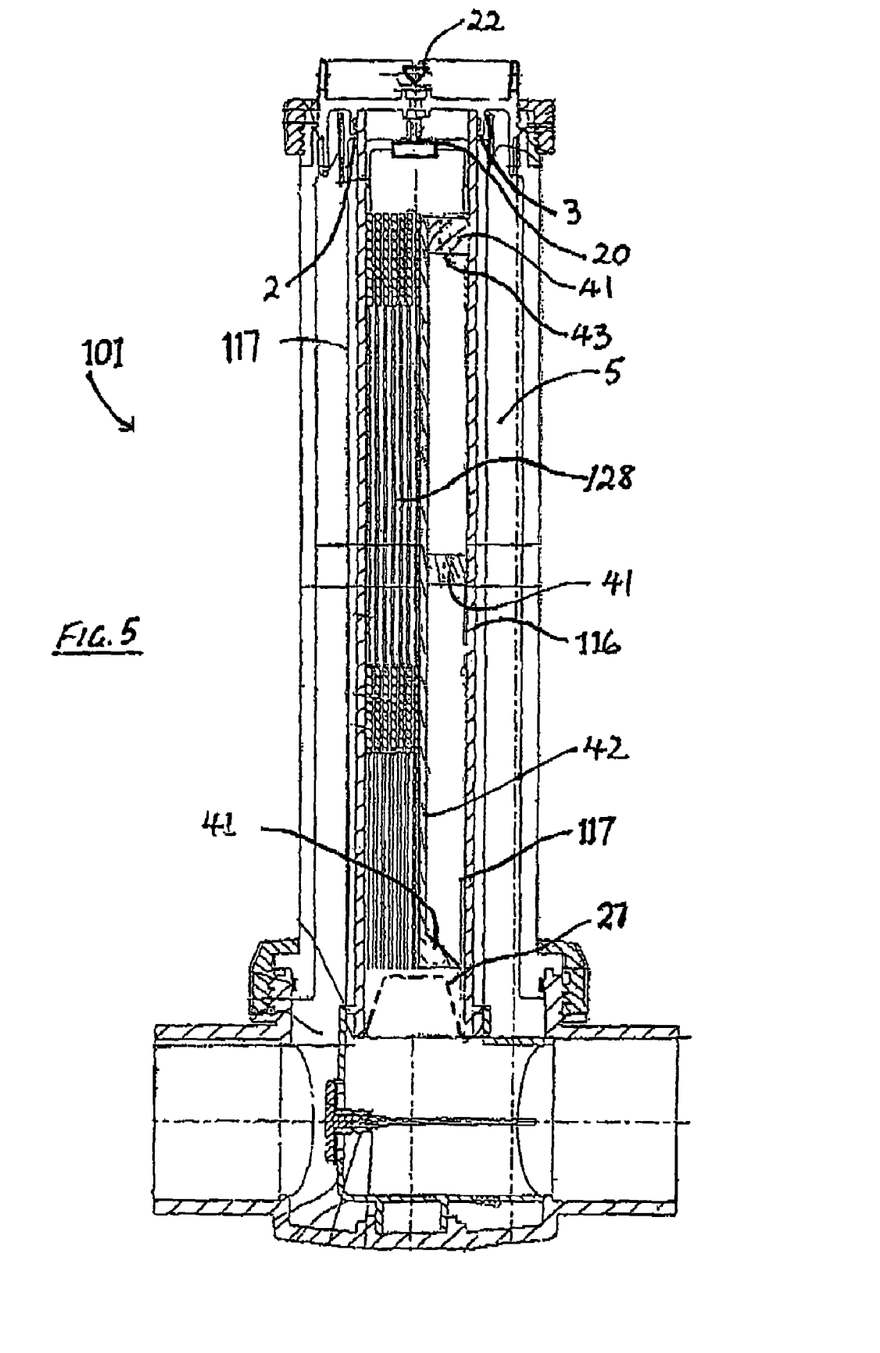
FIG. 5 is a transverse section of an electrolytic cell according to a second embodiment having a small number of electrodes.

A electrode bundle 128 includes a seven plate or blade electrode bundle. The elongate member 42 of the plastic insulator 40 must be inserted alongside and up against the outer face of the exposed seventh electrode and positioned centrally within the electrode column 116. This insulates the oater portion of this seventh plate and restricts the ability for the face of same to take part in the electrolytic reaction. If the face of the seventh plate was exposed, current leakage might increase and cell efficiency may decrease.

The area of the perpendicular barrier that affects the flow restriction should approximate the restriction to flow affected as if the remaining six electrodes were in place. In general, the restrictive area would equate to between 2.0 to 10.0 cm2 and more particularly 5.0 cm2. This ensures a consistent water flow through the electrode plates 128 whether there exists a thirteen-plate 28 or seven-plate configuration 128. The insulation barrier 40 is not needed in the 13-plate configuration when the electrode bundle column 16 itself provides an effective insulation barrier.

Manufacturers of pools or spas typically give installers advice as to what is the preferred salinity level of the pool or spa water. For various reasons, pool or spa water often has a resultant salinity higher than that which is recommended. As a salinity overload safety feature, many chlorinator power supplies are current limited. This limits the current draw of the cell and protects the power supply. A typical chlorinator power supply has electronic circuits that will current limit or, in effect, reduce the DC voltage to the cell in order to control the amp draw of the cell.

The method by which power is supplied to a bi-polar electrode bundle arrangement such as in cell 1 is important in determining chlorine production efficiency, reverse polarity self cleaning efficiency and electrode lifetimes. As a benchmark it is preferable to maintain DC voltage at no less than 4.0 Volts per cell to optimise efficiency and electrode lifetimes.

The delivery of power to the cell may involve the use of a microprocessor in association with the low voltage DC power supply. This enables the processing of current draw and voltage information obtained from the electrode bundle 28,128. The current draw information is directly related to the salinity level or conductivity of the water. If the current draw exceeds the predetermined maximum required for the cell 1,101 to produce the published chlorine maximum, the power on/off duty cycle will be automatically altered such that the chlorine production rate per hour is maintained as per the stated output. Although the current density may be greater at times when the salinity is higher than required, the automatic duty cycle modulation ensures that in such cases, the power ON portion of the cycle will be proportionately reduced and the OFF portion increased, ensuing electrode lifetimes are not compromised.

In effect, if the salt level is at the predetermined recommended level or if it is up to 85% in excess, the power delivered to the cell 1 over a 24 hr period will remain constant as will the chlorine output. Excess salt levels over and above 85% of the recommended concentration will cause inefficiencies in the cell 1 to develop. An excess of salt to this degree would be highly unlikely. If, however, this does occur, analysis by the microprocessor would recognise this excess and the diagnostic display on the power supply would recommend dilution of the water and/or the microprocessor would switch off power to the cell 1,101.

Although the power supply must be designed to handle a higher current than may usually be provided, the increase in VA power of the transformer need not be proportional to the maximum current increase desired. If an excess salt level exists and a higher current is drawn by the cell than is normally required to produce the published chlorine output per hour, the ON portion of the duty cycle is reduced and the OFF portion of the duty cycle is correspondingly increased. Because the duty cycle modulation is based on the current draw information obtained from the cell 1,101, the power output per hour of the power supply remains constant even if the salinity is up to 85% higher than normally required to achieve the stated maximum chlorine output. The automatic reduction in the ON time portion of the duty cycle if excess salt is present obviates the requirement for the use of a proportionally larger VA transformer than would normally be the case if this automatic duty cycle modulation was not effected.

The preferred form of the invention may obviate the need to manually test the cell to determine the condition of the cell 1,101 and can provide for means to incorporate testing means into the apparatus. Salinity is measured within the cell 1,101 via the sensors 23 and the information is processed and interpreted according to a known relationship of cell current draw verses salinity by the microprocessor. If the cell 1,101 draws a lower current than that which is anticipated as per the relationship programmed into the microprocessor, an indication that the cell electrode bundle 28,128 is faulty will be illuminated on the display.

Many chlorinators presently on the market determine the salinity of the water via the current draw of the cell only. This method, however, may cause the operator to over-salt the pool if the cell is faulty or is at the end of it's life and draws a lower current.

The preferred form of the invention may also obviate the need to manually switch the chlorinator cell 1,101 off to prevent over-chlorination when the body of water being treated is reduced in volume by a factor of up to 20 times. This typically occurs with a combined pool and spa where the chlorinator cell serves to treat both pool and spa under normal filtration conditions. The body of water associated with the pool and spa combination is normally 50,000 L, the spa is typically only 1500 L. If the plumbing, for example by the use of valves, isolates the pool from the filter system so that the spa volume alone is being filtered, the chlorinator must switch off or operate at a reduced output. Otherwise over chlorination will result. The preferred embodiments 1,101 recognise the heating of the spa via a flow switch plumbed into the spa suction line. In a pool and spa combination, generally the only time the spa suction is opened is when the spa is being heated and used. A flow switch in the spa suction line is used to provide feedback to the microprocessor which controls the operation of the chlorinator that the spa heating or use cycle has begun. The flow switch located in the spa suction line is activated so that the microprocessor recognises this condition and the power to the cell chlorinator is switched off or reduced to a limited output level. This ensures that the small body of water in the spa will not be over chlorinated.

The chlorinator cell 1,101 has a flow switch 20 associated with or connected to it. When the flow switch 20 is activated (i.e. low or no water flow through the cell 1,101), chlorine production is switched OFF or a reduced output mode is activated. The flow switch 20 is positioned in the cell 1,101 and relays information to the master control or microprocessor regarding the flow condition.

Generally when a pool pump (not shown) is starve of water, the water within the pump will heat up and damage the pump. The apparatus can include, a pump protection monitor within the chlorinator cell 1,101 which records the time or duration that the flow through the cell 1,101 has ceased and, according to a preprogrammed time delay, will switch off both the chlorine cell 1,101 and the pump. This protects the pump from miming dry and damaging itself.

Any auxiliary device/s may also be operated from the microprocessor of the chlorinator cell 1,101 and may be protected in the same way as the pump as described above.

For example, the apparatus can include a first and a second time clock. The second time clock within the microprocessor or chlorinator may be used to control a second pump which may be used to regulate the operation of a pressure-type pool cleaner. In this case, a flow sensor 20 located within the cell 1,101 aid positioned on the return line downstream of all of the other equipment in the filtration system, will detect when flow ceases. The pressure pump used to operate the cleaner requires the primary filter pump to be operating correctly to provide water to the pressure pump. If the filter pump is switched off or is being used to backwash the filter, water flow on the return line ceases and the pressure pump will be starved of water thereby damaging it if it is not switched off. This arrangement obviates the need to manually switch the pressure pump off. Via the flow switch 20, the processor switches the pressure pump off during any period in which it detects no flow.

Under prior art regimes, the operator must manually test the salt level by means of a conductivity test apparatus or chemical test. Once the salt level is established, a manual calculation of the salt requirement is performed using a table. This table lists the amount of salt required to raise a volume of water to a specific salinity. In the present arrangement, assuming the correct water body volume has been recorded by input into the microprocessor, the microprocessor is adapted to indicate to an operator, via the display, how much salt to add to correct any deficiency in the level of water salinity.

The salt sensors 23 within the cell column 16 inform the microprocessor of the level of salinity of the body of water and reference this salinity level to the target salinity which is recommended by the manufacturer.

The operator/installer must program into the chlorinator 1,101 the water body (such as pool) volume. The microprocessor is then able to calculate the salt deficiency based on known formulae and to display the recommended salt addition required to correct this deficiency.

The substantially vertical or upright cell design allows the entire cell assembly to be installed in a plumbing circuit using a total of 190 mm of pipe space. No other cell presently available can be installed in a plumbing circuit where only 190 mm of plumbing space is available. Many cells presently available use approximately 225 mm to 400 mm of plumbing space. The facility for the inventive cell to be fitted into limited plumbing space has inherent safety implications.

Salt chlorinator installation instructions, independent of the design, should always insist that the cell installation be downstream of all of the other filtration system receptacles. This ensures concentrated chlorine produced does not corrode heaters, for example. It also helps to eliminate the possibility of a dangerous volume of hydrogen gas accumulating in the filter bowl or the solar heating system or any other receptacle where accumulation of in excess of 2.0 L of gas may occur.

It is the inventor's 20 years experience in this field that has shown that instructions are not always followed by the installer if adhering to them requires more time and effort. It is a re-occurring theme that installers of these devices find the large space required by some of the presently available chlorinator cells particularly difficult to fit, especially in retro-fit applications. If the installer does not fully appreciate the implications of installing the cell upstream of all the other filtration equipment receptacles, he may install it upstream if the plumbing more easily allows for it. Because the electrolytic cell 1 disclosed herein uses only 190 mm of plumbing space, the likelihood of finding a satisfactory area downstream of the other receptacles is greater.

EXAMPLE

If the tested salinity is 2000 ppm, the pool volume is 45,000 L and the target salinity is 2500 ppm, the chlorinator 1 will display a required salt addition of 22.5 kg to rectify the deficiency.

UTILITY OF INVENTION

There is no practical way of ensuring that the cell is installed in the correct downstream position of the plumbing system thus preventing the possibility of a hydrogen gas accumulation in the equipment receptacles. The preferred cell arrangement, however, has inherent physical design and electronic features to safely control the hydrogen gas production if the cell is not installed vertically or a flow fail condition occurs. These features are not negated if the cell is installed upstream of the other equipment receptacles in the system and the likelihood of a hydrogen gas accumulation occur in one or more of the other receptacles is greatly reduced.

Throughout the specification, including any claims, the word "comprise" and its derivatives are intended to have an inclusive rather than exclusive meaning unless the context requires otherwise.

It will be appreciated by those skilled in the art that many modifications and variations may be made to the embodiments described herein without departing from the spirit or scope of the invention.

The invention claimed is:

1. An electrically powered apparatus for generating a solute to sanitize a body of water, a by-product of such generation being an explosive gas, said apparatus including:
    a) an electrolytic cell operable only in a substantially vertical orientation and through a range of angles either side of the vertical up to a predetermined maximum angle, the maximum angle being 45 degrees or less;
    b) a water inlet and outlet both located at the lower end of said electrolytic cell whereby no water can permanently collect above the base of the electrodes of said electrolytic cell;
    c) a defined space surrounding said electrodes of said electrolytic cell, such that, in the event that water flow through said apparatus ceases and said electrolytic cell continues to produce said explosive gas, said explosive gas will displace water in said defined space until there is no water around or between said electrodes that would enable electrolysis and explosive gas production to continue and the maximum accumulated volume of said explosive gas is substantially restricted to that of said defined space; and
    d) a bi-directional water flow by-pass means located at the lower end of the electrolytic cell to cause a portion of the total water flow to by-pass said electrolytic cell by passing directly from said inlet to said outlet, wherein said by-pass means regulates water flow to said electrolytic cell, allowing excess water flow to by-pass said electrolytic cell.

2. An apparatus according to claim 1, further including a lower chamber incorporating said inlet and said outlet.

3. An apparatus according to claim 1, wherein said by-pass means serves two purposes:
    (1) to deliver a predetermined water flow through an electrode chamber defining said defined space while allowing excess water flow to by-pass said electrode chamber; and
    (2) to prevent undesirable back pressure in systems where the flow rate is or must remain high.

4. An apparatus according to claim 3, wherein said apparatus includes a chlorinator power supply that uses current draw information derived from said cell electrodes to modulate and control power delivery to said electrolytic cell to fully optimize cell efficiency and durability even if the salinity is higher than ideal.

5. An apparatus according to claim 4, wherein said current draw information is directly related to the salt levels in the water such that if the current draw exceeds a predetermined maximum required for said electrolytic cell to produce a published chlorine maximum, an On/Off duty cycle of the power delivery to said electrolytic cell is altered so that the total chlorine production per hour is moderated to correspond to the desired chlorine production rate.

6. An apparatus according to claim 3, further including a salinity sensor adapted to communicate data to a microprocessor associated with said electrolytic cell, said microprocessor operable to regulate the operation of said electrolytic cell.

7. An apparatus according to claim 3, further including a current draw sensor adapted to communicate data to a microprocessor which responds to said data to regulate the operation of said electrolytic cell.

8. An apparatus according to claim 1, wherein said by-pass means comprises a bi-directional check valve, wherein said check valve provides for the bi-directional flow of water across said check valve while controlling the water flow provided by a pump through said electrolytic cell, the flow of water across the opening allowing enough water to flow through it in both directions such that it is at least equivalent to the rate at which the hydrogen gas displaces the water in the electrode chamber.

9. An apparatus according to claim 8, further including a pressure relief valve in said lower chamber, wherein, in the event that both said inlet and outlet are closed and augmentary electronic protection devices fail to detect the absence of water flow and fail to suspend power to said electrolytic cell, said pressure relief valve will open to allow the hydrogen gas to displace the water from said cell chamber which, when complete, will effectively cause a cessation of electrolysis.

10. An apparatus according to claim 1, further including an inner bi-polar electrode bundle comprising between seven and nineteen electrode plates.

11. An apparatus according to claim 1, further including a flow switch to detect the absence of water flow through said apparatus, whereby said flow switch is adapted to effect the cutting of power to said apparatus if the water flow reaches an unsustainably low rate.

12. An apparatus for generating a solute to sanitize a body of water, a by-product of such generation being an explosive gas, said apparatus including:
    a) an electrolytic cell comprising at least one electrode and operable through a range of angles from vertical up to within 45 degrees to the vertical;
    b) a water inlet and outlet integral to a lower body chamber of said electrolytic cell whereby no water can permanently collect above the base of the at least one electrode of said electrolytic cell;
    c) a defined space, surrounding the at least one electrode of said electrolytic cell, and configured to enable said explosive gas to displace water in said defined space, in the event that water flow through said apparatus ceases, until said explosive gas substantially fills said defined space; and
    d) an orientation responsive means to switch off power to said electrolytic cell when said electrolytic cell is orientated outside said range of angles.

13. An apparatus according to claim 12, wherein said orientation responsive means is a tilt switch associated with said electrolytic cell, said tilt switch being adapted to prevent delivery of power to said electrolytic cell when said electrolytic cell is orientated outside said range of angles.

14. An apparatus according to claim 13, wherein said tilt switch is wired and fitted into said electrolytic cell, wherein if said electrolytic cell is not vertically upright when plumbed, said tilt switch, which will have a predetermined electrical contact break at a specific angle of less than 45 degrees from the vertical, will activate to cut power to said electrolytic cell.

15. An apparatus according to claim 12, further including:
    e) a cell chamber housing said electrolytic cell and defining said defined space, whereby said cell chamber defines a passage for the in-flow of water from said inlet; and f) an outer chamber, housing said cell chamber whereby an outer space is defined between the outer surface of said cell chamber and the inner surface of said outer chamber, the outer space serving as a return passage for outgoing water which has come from said electrolytic cell and is heading for said outlet.

16. An apparatus for generating a solute to sanitize a body of water, a by-product of such generation being an explosive gas. said apparatus including:
   a) an electrolytic cell installed at least within 45 degrees of a vertical orientation;
   b) a water inlet and outlet both located at the lower end of said electrolytic cell whereby no water can permanently collect above the base of the electrodes of said electrolytic cell; and
   c) a defined space surrounding said electrodes of said electrolytic cell, arranged such that, where there are less than a full complement of electrode plates necessary to fill said defined space, the defined space contains an insulator and flow regulator configured to fill at least a cross-sectional area of said defined space not occupied by the electrodes and to provide resistance to water flow which would otherwise be present with the full complement of plates, and wherein the defined space is adapted to substantially restrict a volume of explosive gas produced during electrolysis to that of said defined space, in the event water flow to said electrolytic cell ceases.

* * * * *